United States Patent
Berberian

(10) Patent No.: US 10,834,324 B2
(45) Date of Patent: Nov. 10, 2020

(54) IMAGE DISTORTION CORRECTION OF A CAMERA WITH A ROLLING SHUTTER

(71) Applicant: Mobileye Vision Technologies Ltd., Jerusalem (IL)

(72) Inventor: Yael Berberian, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 16/531,425

(22) Filed: Aug. 5, 2019

(65) Prior Publication Data

US 2019/0356830 A1 Nov. 21, 2019

Related U.S. Application Data

(63) Continuation of application No. 16/132,730, filed on Sep. 17, 2018, now abandoned, which is a continuation of application No. 15/055,723, filed on Feb. 29, 2016, now Pat. No. 10,079,975, which is a
(Continued)

(51) Int. Cl.
*H04N 5/232* (2006.01)

(52) U.S. Cl.
CPC ....... *H04N 5/2329* (2013.01); *H04N 5/23248* (2013.01); *H04N 5/23254* (2013.01); *H04N 5/23267* (2013.01)

(58) Field of Classification Search
CPC .... H04N 5/2329; H04N 5/3532; H04N 5/353; H04N 5/23248; H04N 5/23254; H04N 5/23267
See application file for complete search history.

(56) References Cited

U.S. PATENT DOCUMENTS

| 6,307,959 B1 | 10/2001 | Mandelbaum et al. |
| 7,844,134 B2 | 11/2010 | Sasaki et al. |
| 8,169,519 B1 | 5/2012 | Mcclatchie |

(Continued)

FOREIGN PATENT DOCUMENTS

| EP | 2770728 A2 | 8/2014 |
| EP | 2770728 A3 | 9/2016 |

(Continued)

OTHER PUBLICATIONS

"U.S. Appl. No. 14/185,217, Final Office Action dated Jul. 16, 2015", 8 pgs.

(Continued)

*Primary Examiner* — Nicholas G Giles
(74) *Attorney, Agent, or Firm* — Schwegman Lundberg & Woessner, P.A.

(57) ABSTRACT

Correcting image distortion during camera motion using a system including a processor and a camera having a rolling shutter. Multiple image frames are captured by the camera equipped with the rolling shutter. The captured image frames include a base image frame and a previous image frame. Multiple time stamps are recorded respectively for multiple corresponding image points in the previous and base image frames. For the corresponding image points, multiple ego-motions are computed responsive to the time stamps of the corresponding image points of the base image frame and the previous image frame to correct the image distortion caused by the rolling shutter.

10 Claims, 2 Drawing Sheets

Related U.S. Application Data continuation of application No. 14/185,217, filed on Feb. 20, 2014, now Pat. No. 9,277,132.

(60) Provisional application No. 61/767,332, filed on Feb. 21, 2013.

(56) References Cited

U.S. PATENT DOCUMENTS

| | | | |
|---|---|---|---|
| 8,456,517 | B2 | 6/2013 | Spektor et al. |
| 8,488,895 | B2 | 7/2013 | Muller et al. |
| 8,643,752 | B1 | 2/2014 | Mcclatchie |
| 8,744,169 | B2 | 6/2014 | Othmezouri et al. |
| 8,786,716 | B2 | 7/2014 | Zhou |
| 8,913,140 | B2 | 12/2014 | Zhou |
| 9,277,132 | B2 * | 3/2016 | Berberian .......... H04N 5/23248 |
| 10,079,975 | B2 * | 9/2018 | Berberian .......... H04N 5/23248 |
| 2005/0111698 | A1 | 5/2005 | Kawai |
| 2005/0140670 | A1 | 6/2005 | Wu et al. |
| 2007/0120997 | A1 * | 5/2007 | Sasaki ................ H04N 5/23248 348/362 |
| 2011/0074927 | A1 | 3/2011 | Perng et al. |
| 2011/0211082 | A1 | 9/2011 | Forssén et al. |
| 2012/0308114 | A1 * | 12/2012 | Othmezouri ............ G06T 7/285 382/154 |
| 2013/0044230 | A1 | 2/2013 | Zhou |
| 2013/0044241 | A1 | 2/2013 | Zhou |
| 2014/0232887 | A1 * | 8/2014 | Berberian .......... H04N 5/23248 348/208.6 |
| 2016/0182793 | A1 * | 6/2016 | Berberian .......... H04N 5/23248 348/208.6 |
| 2019/0089888 | A1 * | 3/2019 | Berberian .......... H04N 5/23248 |

FOREIGN PATENT DOCUMENTS

| | | | |
|---|---|---|---|
| WO | WO-2012175703 | A1 | 12/2012 |
| WO | WO-2013151873 | A1 | 10/2013 |

OTHER PUBLICATIONS

"U.S. Appl. No. 14/185,217, Non Final Office Action dated Mar. 10, 2015", 9 pgs.

"U.S. Appl. No. 14/185,217, Notice of Allowance dated Oct. 28, 2015", 5 pgs.

"U.S. Appl. No. 14/185,217, Response filed Jun. 8, 2015 to Non Final Office Action dated Mar. 10, 2015", 8 pgs.

"U.S. Appl. No. 14/185,217, Response filed Oct. 16, 2015 to Final Office Action dated Jul. 16, 2015", 7 pgs.

"U.S. Appl. No. 15/055,723, 312 Amendment filed May 15, 2018", 3 pgs.

"U.S. Appl. No. 15/055,723, Examiner Interview Summary dated Dec. 7, 2017", 3 pgs.

"U.S. Appl. No. 15/055,723, Final Office Action dated Apr. 14, 2017", 19 pgs.

"U.S. Appl. No. 15/055,723, Non Final Office Action dated Sep. 6, 2017", 17 pgs.

"U.S. Appl. No. 15/055,723, Non Final Office Action dated Nov. 7, 2016", 12 pgs.

"U.S. Appl. No. 15/055,723, Notice of Allowance dated May 8, 2018", 8 pgs.

"U.S. Appl. No. 15/055,723, PTO Response to Rule 312 Communication dated Jun. 1, 2018", 2 pgs.

"U.S. Appl. No. 15/055,723, Response filed Jul. 8, 2018 to Non Final Office Action dated Sep. 6, 2017", 17 pgs.

"U.S. Appl. No. 15/055,723, Response filed Feb. 7, 2017 to Non Final Office Action dated Nov. 7, 2016", 18 pgs.

"U.S. Appl. No. 15/055,723, Response filed Aug. 14, 2017 to Final Office Action dated Apr. 14, 2017", 15 pgs.

"U.S. Appl. No. 16/132,730, Non Final Office Action dated Feb. 21, 2019", 15 pgs.

"U.S. Appl. No. 16/132,730, Response filed Jun. 21, 2019 to Non-Final Office Action dated Feb. 21, 2019", 7 pgs.

"European Application Serial No. 14275028.0, Extended European Search Report dated Aug. 8, 2016", 8 pgs.

Dedborg, Johan, et al., "Rolling shutter bundle adjustment", Computer Vision and Pattern Recognition (CVPR), 2012 IEEE Conference on. IEEE, (2012), 1434-1441.

Forssen, et al., "Computer Vision on Rolling Shutter Cameras Part II: Rolling Shutter Geometry Computer", Vision Laboratory Dept. of Electrical Engineering Linkoping University, Per-Erik Forssen, (Jun. 16-21, 2012), 35 pgs.

Hanning, Gustav, et al., "Stabilizing cell phone video using inertial measurement sensors", Computer Vision Workshops (ICCV Workshops), 2011 IEEE International Conference on. IEEE, (2011), 8 pgs.

Hedborg, John, et al., "Structure and motion estimation from rolling shutter video", Computer Vision Workshops (ICCV Workshops), 2011 IEEE International Conference on. IEEE, (2011), 17-23.

Irani, et al., "Recovery of Ego-Motion Using Region Alignment", IEEE Transactions on Pattern Analysis and Machine Intelligence, vol. 19, No. 3, (Mar. 1997), 268-272.

Klinger, Bryan, et al., "Street View Motion-from-Structure-from-Motion", IEEE International Conference on Computer Vision, (2013), 953-960.

Meingast, et al., "Geometric models of rolling-shutter cameras", arXiv preprint cs/0503076v1, (2005), 8 pgs.

Oth, L., et al., "Rolling Shutter Camera Calibration", In Computer Vision and Pattern Recognition (CVPR), 2013 IEEE Conference on IEEE, (Jun. 2013), 1360-1367.

\* cited by examiner

IMAGE DISTORTION CORRECTION OF A CAMERA WITH A ROLLING SHUTTER

This application is a continuation of U.S. patent application Ser. No. 16/132,730, filed Sep. 17, 2018, which is a continuation of U.S. patent application Ser. No. 15/055,723, which was filed on Feb. 29, 2016, which is a continuation of U.S. patent application Ser. No. 14/185,217, filed Feb. 20, 2014, which claims the benefit of priority to U.S. Provisional Application Ser. No. 61/767,332, filed Feb. 21, 2013, all of which are incorporated by reference herein in their entirety.

BACKGROUND

1. Technical Field

The present disclosure relates to correction for distortions arising from use of a rolling shutter, and more particularly for use in a camera based driver assistance/control system.

2. Description of Related Art

Rolling shutter is a method of image acquisition in which each frame is recorded not from a snapshot of a single point in time, but rather by scanning across the image frame, for instance row by row. With a rolling shutter, not all parts of the image are recorded at exactly the same time, even though the whole frame may be displayed at the same time during playback. The rolling shutter is in contrast with a global shutter where the entire frame is exposed for the same time window.

Ego-motion "self-motion" refers to the translation and orientation (e.g., yaw, pitch and roll) in time of moving camera. A measure of ego-motion or of the camera mounted in a vehicle is important for driver assistance and/or vehicle control systems in order to accurately detect, recognize and avoid false positive detections of: other vehicles, obstacles, lights, street signs, lane markers and/or guard rails in the road environment.

Structure-from-Motion (SfM) refers to methods for recovering three-dimensional information of a scene that has been projected onto the focal plane(s) of a moving camera or multiple cameras. The structural information derived from a SfM algorithm may take the form of a set of projection matrices, one projection matrix per image frame, representing the relationship between a specific two-dimensional point in the image plane and its corresponding three-dimensional point. SfM algorithms rely on tracking specific image features from image frame to image frame to determine structural information concerning the scene.

BRIEF SUMMARY

Various systems and methods are disclosed herein for correcting image distortion during camera motion using a system including a processor and a camera having a rolling shutter. Multiple image frames are captured by the camera equipped with the rolling shutter. The captured image frames include a base image frame and a previous image frame. Multiple time stamps are recorded respectively for multiple corresponding image points in the previous and base image frames. For the corresponding image points, multiple ego-motions are computed responsive to the time stamps or capture times of the corresponding image points of the base image frame and the previous image frame to correct the image distortion caused by the rolling shutter. The computation of the ego-motions may be performed using image data from the image frames of the camera. The corresponding image points of the base image frame and the previous image frame are image points of the same object point. The computation of the ego-motions may be responsive to the time stamp difference between the corresponding image points. Image disparities may be computed based on the ego-motions. Distance to an object being imaged may be computed based on the ego-motions. The ego-motions may be determined by using an iterative process wherein an optimization goal is to minimize the distances between the epipolar lines corresponding to the image points in the previous image and the matching image points in the base image.

BRIEF DESCRIPTION OF THE DRAWINGS

The invention is herein described, by way of example only, with reference to the accompanying drawings, wherein.

Figure 1:
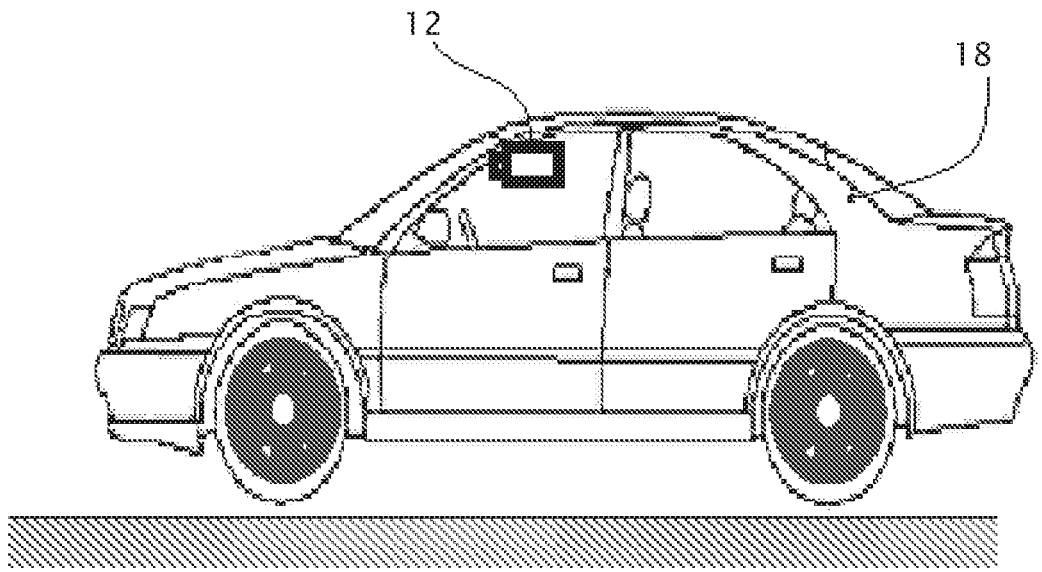
FIGS. 1 and 2 illustrate a system including a camera with a rolling shutter mountable in a vehicle, according to an aspect of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are based on ego-motion computations from the image data of a moving camera. When ego-motion computations are available as in driver assistance systems and/or vehicle control systems, computational resources may be saved by using the available ego-motion information. By way of example, a structure from motion (SfM) algorithm may use an ego motion matrix C which describes the ego-motion of a camera moving in real space while capturing a pair of image frames ("base" and "previous"). The SfM algorithm may use the ego motion matrix C and image point correspondences between the pair of image frames to calculate real space distances to objects being imaged. Such an ego motion matrix C describes the camera motion while capturing two image frames in which all pixels of each image frame are sampled at the same time. A rolling shutter renders the use of a single ego motion matrix C inadequate, as the motion of the camera is different for each pair of corresponding image points. Therefore, in order to fully describe the motion of the camera between two image frames, as many ego motion matrix matrices C are required as the number of corresponding pixel pairs. Such an approach would be computationally prohibitive for use in driver assistance and control systems which are required to respond in real time.

However, assuming that the ego motion matrix C between points sampled at time t=0 is known, and that the characteristics of the camera motion did not change considerably between the two image frames, the timestamps between rows may be used to compute the real ego motion between capture times of image points. In practice, because of various other distortions the captured image undergoes (e.g. distortion from optical system and/or camera calibration distortion), a different time stamp for each pixel may be obtained and used rather than a time stamp per row. In this way, the other distortions may be considered in addition to the rolling shutter distortion by adjusting the time stamp according to the known distortion per pixel.

Figure 2:
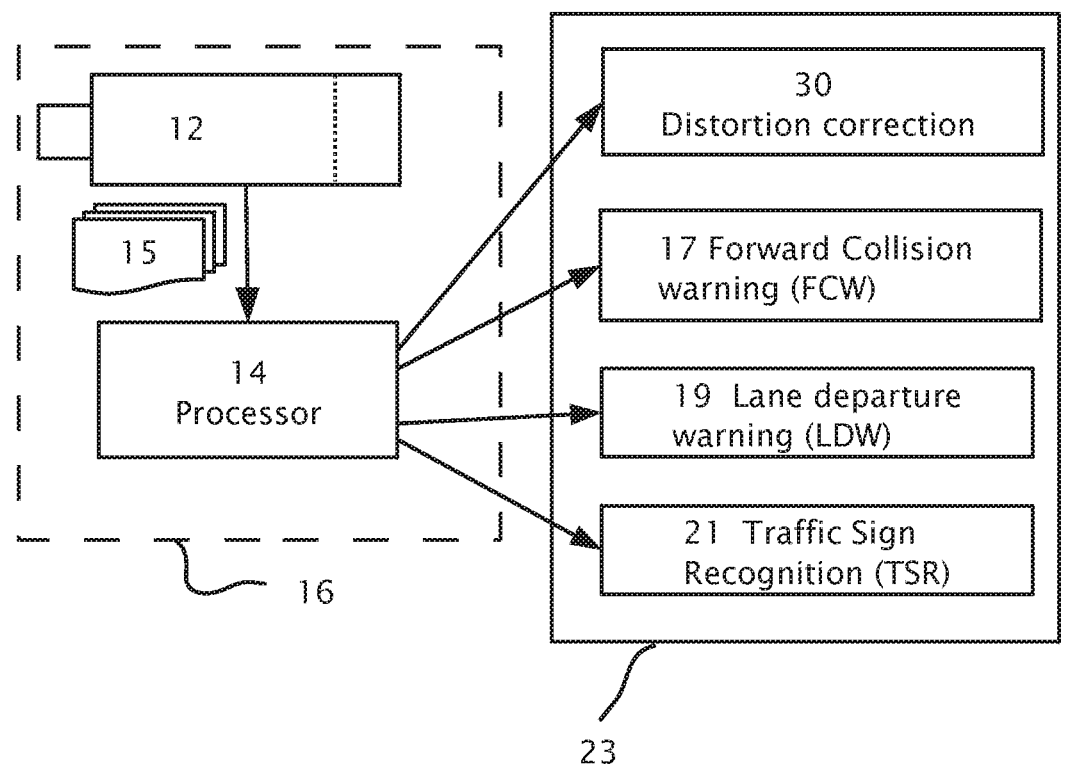

Referring now to the drawings, reference is now made to FIGS. 1 and 2 which illustrate a system 16 including a camera or image sensor 12 with a rolling shutter mountable in a vehicle 18, according to an aspect of the present invention. Image sensor 12, imaging a field of view in the forward direction typically captures in real time a time series of image frames 15. An image processor 14 may be used to process image frames 15 simultaneously and/or in parallel to serve a number of driver assistance and/or control systems. Image sensor 12 may be monochrome or black-white, i.e. without color separation. By way of example in FIG. 2, image frames 15 may be used to serve a monitor/control system 23 which may include collision warning 17, lane departure warning 19, traffic sign recognition (TSR) 21 and structure from motion (SfM) with rolling shutter distortion correction 30 according to embodiments of the present invention. Structure from motion may include for example presenting three dimensional imagery on a display to the driver, measuring distance to objects being imaged or the detection of three dimensional structures including curbs, guard rails, structural barriers, e.g. concrete lane divider. Aspects of the present invention may include exchange of information between SfM 30 and other driver assistance functions and/or systems including but not limited by FCW 17 and LDW 19. For example, a Lane Departure Warning (LDW) 19 as part of warning system 23, may respond more strongly to a lane departure towards a guard rail or a barrier rather than a lane marker or even a white line. A Forward Collision Warning (FCW) system 19 may trigger sooner if the path to either side of in-path vehicle is blocked by a guard rail or another vehicle.

The terms "camera" and "image sensor" are used herein interchangeably. The term "object" as used herein refers to an object in real space being viewed by a camera. A guard rail along the edge of a road and a lane marker in the road are examples of objects. The term "image" refers to the image of one or more objects in image space at the focal plane of camera 12. Image coordinates (x,y) in small letters refer to image space and may be in arbitrary units or numbers of picture elements in the horizontal and vertical directions with the pixel dimensions assumed.

The term "image point" as used herein refers to a point (x,y) in image space. The term "pixel" short for "picture element" and "image point" are used herein interchangeably. The term "corresponding" as used herein in the context of "corresponding" image points refers to image points of different image frames of a time sequence which have been found to be image points of the same object point. The terms "corresponding" image points and "matching" image points are used herein interchangeably.

The term "time stamp" as used herein refers to a point in time relative to a reference time which may be selected during a time sequence of image frames. The term "time stamp" as used herein is a capture time of an image point or image row of the rolling shutter. The time stamp may be further adjusted to correct for another known distortion in the camera other than that caused by the rolling shutter in which case the time stamp used is not strictly the capture time of the image point.

The term "image motion" refers to motion of an image of an object in image space. From image frame 15 to a subsequent image frame 15 the points of the image of the object may map from one set of coordinates (x1, y1) to a different set of coordinates (x2, y2). The term "image motion" refers to the mapping of coordinates of an image from image frame to image frame or a function of the mapping. The term "projection" or "projecting" as used herein refers to camera or perspective projection unless otherwise indicated by the context.

Figure 3:
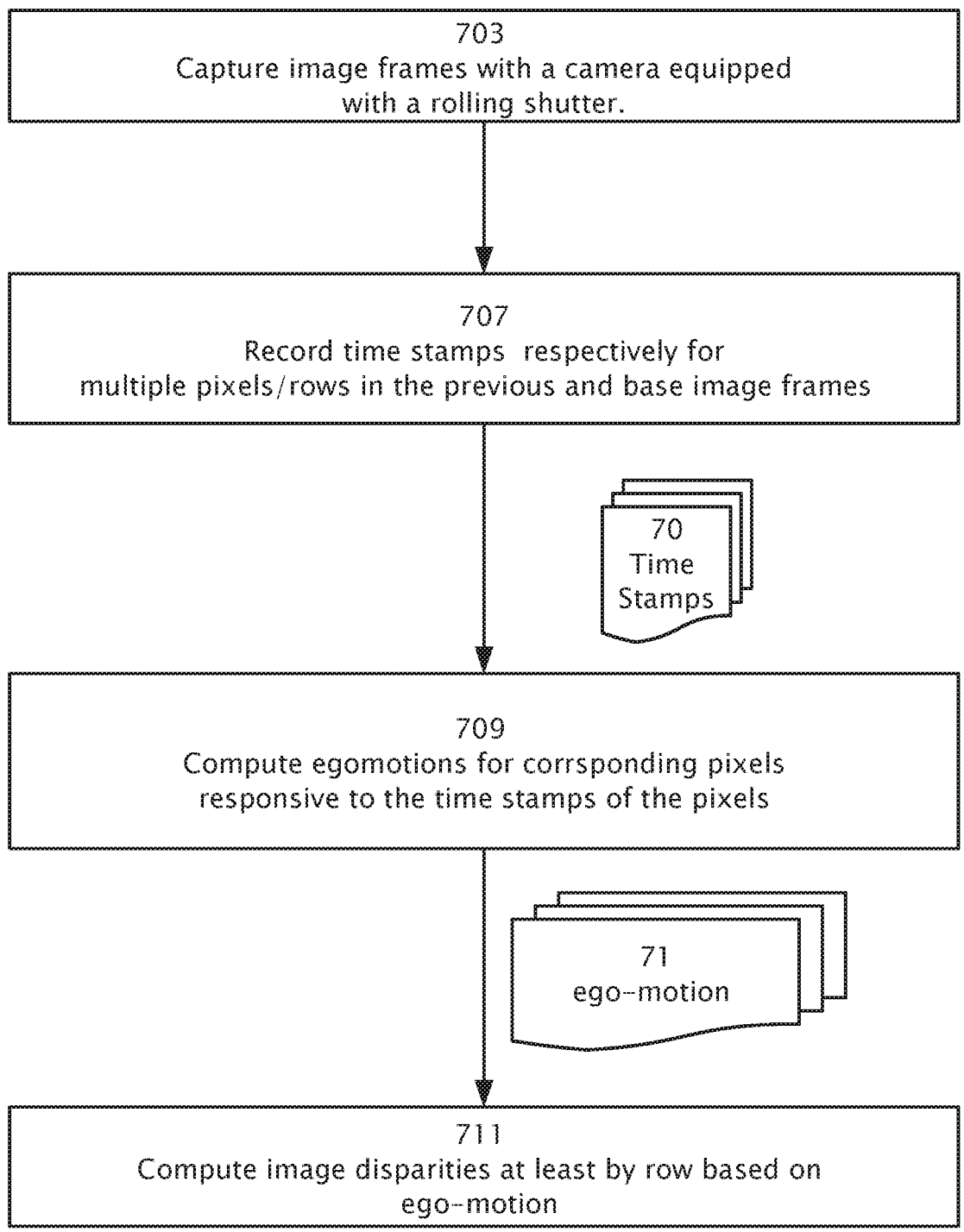
FIG. 3 illustrates a simplified method, according to embodiments of the present invention.

Reference is now also made to FIG. 3 which illustrates a simplified method 30, according to embodiments of the present invention for image distortion correction using a rolling shutter. Image frames are captured (step 703) with a camera equipped with a rolling shutter. Time stamps 70 are recorded (step 707) for multiple rows in the previous and base image frames or for multiple pixels per row in both. In step 709, ego-motion is computed on a row by row or pixel by pixel basis responsive to time stamps 70, and more particularly the ego-motion may be responsive to the difference in time stamps 70 of corresponding pixels in the previous and base image frames. Ego-motion results 71 of the rows and/or of the pixels for corresponding rows and pixels. Ego-motion results may be represented by corrections to a global ego-motion matrix which would be valid for all pixels with the use of a global shutter instead of a rolling shutter. The corrected ego-motion results may be used pixel by pixel or row by row for further image processing such as computation in step 711 of image disparities for providing or displaying structure from motion (SfM). In the description that follows, method 30 is described in further detail with SfM as an example.

As previously stated, an SfM algorithm using a global ego-motion computation assumes that all the pixels in image frame 15 are sampled simultaneously. However, when camera 12 has a rolling shutter, the assumption of simultaneous sampling for all pixels in a single image frame 15 is no longer valid. The rolling shutter therefore produces an image distortion, which affects performance of structure from motion (SfM) algorithm.

A correction to the image distortion may be applied in two stages to the original structure from motion (SfM) algorithm: A. distance estimation correction and B. ego-motion correction.

A. Distance Estimation Correction

The distance correction for the rolling shutter effect of camera 12 is presented here in four main steps. The inputs include the structure from motion (SfM) distance estimation, the ego motion matrix C, time stamps approximation and time difference between the base and previous images. Each of the following steps may be performed for every pixel of the base and previous images; or multiple pixels or multiple rows of the base and previous images:

1. Finding Image Coordinates in the Previous Image

The following equations relate the image coordinates of the base image to the image coordinates of the previous image when the global ego-motion of camera 12 is known.

$$\begin{pmatrix} x \\ y \\ f \end{pmatrix}_b \cdot \frac{Z}{f} = \begin{pmatrix} X \\ Y \\ Z \end{pmatrix}_b$$

$$C^{-1} \begin{pmatrix} X \\ Y \\ Z \\ 1 \end{pmatrix}_b = \begin{pmatrix} X \\ Y \\ Z \\ 1 \end{pmatrix}_p$$

$$\begin{pmatrix} X \\ Y \\ Z \end{pmatrix}_p \cdot \frac{f}{Zp} = \begin{pmatrix} x \\ y \\ f \end{pmatrix}_p = xp$$

where b refers to base image and p refers to the previous image, x, y are image coordinates, f is the focal length of camera 12 and X,Y,Z are real-space Cartesian coordinates of the object point being imaged relative to the camera coordinates. X is the horizontal coordinate, Y is the vertical coordinate and Z is the distance to the object in the forward direction. C is an ego-motion matrix under the assumption of a global shutter.

$C^1$ is the inverse of ego-motion matrix C.

2. Correcting the Ego Motion Matrix

The input C is the ego motion matrix that describes the real-space motion of camera 12 while capturing the previous and base image frames 15 when the rolling shutter effect is not taken into account. In other words, ego motion matrix C describes the hypothetical situation in which camera 12 does not have a rolling shutter and all the pixels are simultaneously sampled. The term "simultaneous" abbreviated as "sim" is used to describe the situation when all the pixels are sampled simultaneously. So the ego motion matrix C describes ego-motion from previous-sim image to base-sim image. The term "rolling shutter", abbreviated "RS" is used to describe the situation when all the pixels are not sampled exactly at the same moment or not sampled simultaneously, i.e camera 12 has a rolling shutter.

In order to correct the effect of the rolling shutter, the ego motion from previous-RS image frame 15 to base-RS image frame 15 is used. Let the desired ego motion matrix be denoted $C_d$. Given that the time difference between the previous and base images is dt, we obtain the following expression for the desired ego-motion matrix $C_d$:

$$C_d = C^{1+\epsilon} = C^{1+\frac{t_b-t_p}{dt}}$$

where $t_b$ and $t_p$ are the base point and previous point's time stamps respectively.

To obtain a representation of the time stamp of a pixel, a polynomial approximation may be used of ego-motion variation due to the rolling shutter. The power of the ego motion matrix C is calculated approximately, using a first order Taylor expansion. The first order Taylor expansion is linear where approximation of $C^\epsilon$, for ε is small, yields the following result:

$$C^\epsilon \approx \begin{pmatrix} I + \epsilon \log R & \epsilon \frac{\log R}{R-I} t \\ 0 & 1 \end{pmatrix}$$

$$C = \begin{pmatrix} R & t \\ 0 & 1 \end{pmatrix}$$

where R is a rotation matrix and I is an identity matrix.

3. Calculating Distance Considering Rolling Shutter Effect

The distance is recalculated in the following way:

1. The previous coordinates $x_p, y_p$ of the previous image frame are rotated to match the base coordinate $x_b, y_b$ of the base image frame so that camera 12 recording the previous image and camera 12 recording the base image are parallel and have the same focus of expansion (FOE)).

2. The focus of expansion FOE is calculated by the following equation:

$$FOE(x, y) = (t_x, t_y) \frac{f}{t_z}$$

where $t_x, t_y, t_z$ are the translation vector components.

3. The disparity, d, is calculated: $d = r_b - r_p$, where $r_b$ is the distance from the pixel to the FOE in the base image and $r_p$ is the same for the previous image.

4. Finally, the distance is calculated:

$$Z_{new} = \frac{-t_z \cdot r_p}{d}$$

4. Final Correction of the Distance

By now the exact distance $Z_{new}$ to each object point imaged by an image point in the base image may be obtained, in real time, which is the real distance at the exact moment in which the image point was recorded. The real distance to each object point imaged by an image point in the exact moment in which the image point was recorded is not the distance sought. Instead it is desired to cancel the effect of the rolling shutting while camera 12 is moving d. What is needed is the distance obtained if camera 12 had no rolling shutter. To get the distance if camera 12 had no rolling shutter, the time stamp of the base pixel is used, to get the following ego motion matrix under assumption of the rolling shutter:

$$C^{\frac{-t_b}{dt}}$$

Multiplying the ego motion matrix in the new base world point found, gets the final world point and the desired distance from it. The corrected ego motion matrices under assumption of the rolling shutter may be used in equations of section A1 to determine the previous image coordinates. The previous image coordinates may be used to determine the distances and disparities under assumption of a rolling shutter from the equations in section A3 above.

B. Ego Motion Estimation Correction

As stated previously, the original structure from motion (SfM) algorithm includes a stage in which the ego motion matrix C is calculated. As explained in the previous section, in the presence of rolling shutter distortions, the matrix which describes the camera 12 movement from previous-RS to base-RS would be $C^a$, where the ego motion matrix C is the camera matrix from previous-sim image to base-sim image is:

$$\alpha = 1 + \epsilon = 1 + \frac{t_b - t_p}{dt}$$

and therefore ε is small. In essence, the rolling shutter effect correction is applied to this stage by replacing the ego motion matrix C with $C^a$ pixel by pixel or row by row and adjusting all the equations previously presented accordingly.

Ego Motion Estimation in the Structure from Motion (SfM) Algorithm

In order to find the ego motion matrix, the structure from motion (SfM) algorithm uses an iterative process where the optimization goal is to minimize the distances between the epipolar lines corresponding to the previous points and the matching base points. Each iteration includes the following steps:

1. Both cameras 12 (previous and base camera 12 orientations) are rotated so that the line connecting their centers would be perpendicular to both image planes. This rotation is done assuming that the matrix $R_p$ and translation vector $t_p$ obtained in the previous iteration (or given as the initial guess) describe the motion from previous to base.

2. In this position the new rotation matrix would be approximately I and the translation vector would be close to:

$$(0\ 0\ -1)^T$$

Thus, after the rotation is done in the first step, the rotation matrix and translation vector between the cameras may be written as:

$$R = I + \Delta = \begin{pmatrix} 1 & -r & y \\ r & 1 & p \\ -y & -p & 1 \end{pmatrix}$$

and $$t = \begin{pmatrix} a \\ b \\ -1 \end{pmatrix}$$

where r, y, p, a, b are unknown parameters assumed to be small.

3. Let v be a point in the base image, and let u be the corresponding point in the previous image (these points are the result of an earlier point matching stage). Let $\tilde{v}$ and $\tilde{u}$ be these points in the coordinate systems of the rotated cameras (step B1). The distance between v and the epipolar line determined by $\tilde{u}$ is:

$$D = \frac{\tilde{v}^T t_x R \tilde{u}}{\sqrt{w_1^2 + w_2^2}}$$

where $$w = t_x R u = (w_1 w_2 w_3)^T$$

D=0 is an equation with five unknowns (r, y, p, a, b); so there are as many such equations as the number of point pairs. Neglecting second-order terms, new R and t are obtained by solving a system of linear equations.

Rolling Shutter Distortion Correction

Having no rolling shutter effects, the ego motion matrix from base image to previous image is:

$$C = \begin{pmatrix} \tilde{R}_2^{-1} & 0 \\ 0 & 1 \end{pmatrix} P \begin{pmatrix} \tilde{R}_1 & 0 \\ 0 & 1 \end{pmatrix}$$

where the first and last matrices describe the rotation of the cameras back to their original position, $$P = t_x R = \begin{pmatrix} I + \Delta & \begin{pmatrix} a \\ b \\ -1 \end{pmatrix} \\ 0 & 1 \end{pmatrix}$$

and translation vector t and rotation matrix R describe the motion between the parallel cameras-after step B1).

Considering the rolling shutter effect, the corrected ego motion matrix would be $$C^a = \begin{pmatrix} \tilde{R}_2^{-1} & 0 \\ 0 & 1 \end{pmatrix} P_a \begin{pmatrix} \tilde{R}_1 & 0 \\ 0 & 1 \end{pmatrix}$$

and thus:

$$P_a = t_a \times R_a = \begin{pmatrix} \tilde{R}_2 & 0 \\ 0 & 1 \end{pmatrix} C^a \begin{pmatrix} \tilde{R}_1^{-1} & 0 \\ 0 & 1 \end{pmatrix}$$

Expanding this expression and using first order Taylor expansions gives the corrected expressions for the translation and rotation matrices, and a new equation (D=0) with the same five unknowns is obtained, only here it incorporates the time stamp difference between pixels caused by the rolling shutter.

The indefinite articles "a" and "an" is used herein, such as "a camera", "an image frame" have the meaning of "one or more" that is "one or more cameras" or "one or more image frames".

Although selected embodiments of the present invention have been shown and described, it is to be understood the present invention is not limited to the described embodiments. Instead, it is to be appreciated that changes may be made to these embodiments, the scope of which is defined by the claims and the equivalents thereof.

What is claimed is:

1. A system for determining a distance to a point from a rolling shutter camera, the system comprising:
   a processor configured to:
      access a first image and a second image of an environment captured by the rolling shutter camera, the first and second images captured while the camera was moving, the first and second images each including a plurality of capture lines, the difference between capture time of respective capture lines of the first and second image being dT;

detect a point (x1, y1) in a capture line of the first image at a time T1, which is the time when the capture line including y1 was captured in the first image;

detect a corresponding point (x2, y2) in a capture line of the second image at a time T2, which is the time when the capture line including y2 was captured in the second image, wherein a difference between the time T2 and the time T1 is not equal to dT; and determine the distance to the point at a time T0, which is different than the time T1 or the time T2.

2. The system of claim 1, wherein the processor is further configured to:

determine a distance to a second point from rolling shutter camera by:

detecting a point (x3, y3) in a capture line of the first image at a time T3, which is the time when the capture line including y3 was captured in the first image;

detecting a point (x4, y4) in a capture line of the second image at a time T4, which is the time when the capture line including y4 was captured in the second image, wherein the time T3 is not equal to the time T1, and the time T4 is not equal to the time T2; and determine the distance to the second point at the time T0, which is different from the time T3 or the time T4.

3. The system of claim 1, wherein the distance to the point from the rolling shutter is calculated by using camera motion detected between the time T1 and the time T2, a line including point (x1, y1) in a first coordinate frame of the rolling shutter camera at the time T1, and a line including the point (x2, y2) in a second coordinate frame of the rolling shutter camera at the time T2, which are transformed to the first coordinate frame of the rolling shutter camera at the time T1 using ego motion between the time T1 and the time T2.

4. The system of claim 3, wherein the processor is further configured to transform a distance to a third coordinate frame at the time T0 using the camera motion detected between the time T1 and the time T0.

5. The system of claim 3, wherein the ego motion represents a translation and a rotation of the rolling shutter camera between the time T1 and the time T2.

6. A method for determining a distance to a point from a rolling shutter camera, the method comprising:

receiving, from the rolling shutter camera, a first image and a second image of an environment of the rolling shutter camera, captured while the camera was moving, the first and second images each including a plurality of capture lines, the difference between capture time of respective capture lines of the first and second image being dT;

detecting a point (x1, y1) in a capture line of the first image at a time T1, which is the time when the capture line including y1 was captured in the first image;

detecting a corresponding point (x2, y2) in a capture line of the second image at a time T2, which is the time when the capture line including y2 was captured in the second image, wherein a difference between the time T2 and the time T1 is not equal to dT; and determining the distance to the point at a time T0, which is different than the time T1 or the time T2.

7. The method of claim 6, further comprising:

determining a distance to a second point from the rolling shutter camera by:

detecting a point (x3, y3) in a capture line of the first image at a time T3, which is the time when the capture line including y3 was captured in the first image;

detecting a point (x4, y4) in a capture line of the second image at a time T4, which is the time when the capture line including y4 was captured in the second image, wherein the time T3 is not equal to the time T1, and the time T4 is not equal to the time T2; and determine the distance to the second point at the time T0, which is different from the time T3 or the time T4.

8. The method of claim 6, wherein determining the distance to the point from the rolling shutter comprises calculating by using camera motion detected between the time T1 and the time T2, a line including point (x1, y1) in a first coordinate frame of the rolling shutter camera at the time T1, and a line including the point (x2, y2) in a second coordinate frame of the rolling shutter camera at the time T2, which are transformed to the first coordinate frame of the rolling shutter camera at the time T1 using ego motion between the time T1 and the time T2.

9. The method of claim 8, further comprising transforming a distance to a third coordinate frame at the time T0 using the camera motion detected between the time T1 and the time T0.

10. The method of claim 8, wherein the ego motion represents a translation and a rotation of the rolling shutter camera between the time T1 and the time T2.

* * * * *

UNITED STATES PATENT AND TRADEMARK OFFICE
CERTIFICATE OF CORRECTION

PATENT NO. : 10,834,324 B2
APPLICATION NO. : 16/531425
DATED : November 10, 2020
INVENTOR(S) : Yael Berberian It is certified that error appears in the above-identified patent and that said Letters Patent is hereby corrected as shown below:

On the Title Page

On page 2, in Column 2, item (56) under "Other Publications", Line 13, delete "Jul. 8, 2018" and insert --Jan. 8, 2018-- therefor Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*